United States Patent
Frost

[11] Patent Number: 6,024,332
[45] Date of Patent: Feb. 15, 2000

[54] SUPPORT CARRIER FOR FISHING WEIGHTS

[76] Inventor: Michael Frost, 730 I St. #226, Anchorage, Ak. 99501

[21] Appl. No.: 09/030,306

[22] Filed: Feb. 24, 1998

[51] Int. Cl.[7] .................................................. A01K 97/00
[52] U.S. Cl. .................... 248/231.51; 43/54.1; 224/563; 248/309.1; 383/43
[58] Field of Search ............................. 248/231.51, 687, 248/614, 453, 462, 229.13, 229.23, 228.4, 230.4, 288.11, 309.1; 383/43; 43/54.1; 224/563

[56] References Cited

U.S. PATENT DOCUMENTS

| | | | |
|---|---|---|---|
| 258,177 | 5/1882 | Weller | 383/43 X |
| 1,074,272 | 9/1913 | Kline | 248/229.23 |
| 1,320,646 | 11/1919 | Paterson | 383/43 |
| 1,475,132 | 11/1923 | Monaghan | 383/43 X |
| 1,786,459 | 12/1930 | Simons | 248/229.13 |
| 1,807,655 | 6/1931 | Eriksson | 383/43 X |
| 2,292,709 | 8/1942 | McCann | 43/54.1 X |
| 2,925,172 | 2/1960 | Hopp | 383/43 X |
| 3,030,681 | 4/1962 | Phillips | 248/229.13 |
| 3,145,748 | 8/1964 | Leonardi | 383/43 X |
| 3,395,788 | 8/1968 | Gill | 43/54.1 X |
| 4,671,009 | 6/1987 | Faunce | 43/54.1 |
| 4,887,784 | 12/1989 | Kayali | 248/231.51 |
| 5,123,197 | 6/1992 | Gentry et al. | 43/54.1 |

*Primary Examiner*—Derek J. Berger
*Attorney, Agent, or Firm*—Michael J. Tavella

[57] ABSTRACT

A basket that can be clamped to a boat's gunwale is used to hold the gear when it is not in use. The basket is large enough to hold the fishing weights and line while a hook is baited, or while the boat is moved. A large spring clip is used to secure the basket to the boat. The clip can be opened to fit over the rail of a boat and be closed over the gunwale. Set screws secure the clip to the boat for use. The basket is a piece of canvas, or similar material, that is suspended between the clips. When the clips are opened and secured over the rail of the boat, the canvas is stretched forming a curved bowl-shaped surface that can hold fishing gear. Once the basket is removed from the boat, the clip closes, folding up the canvas basket for storage.

14 Claims, 4 Drawing Sheets

SUPPORT CARRIER FOR FISHING WEIGHTS

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to support carriers and particularly to support carriers for fishing weights.

2. Description of Related Art

Fishing from boats is an old activity. Fishing gear has evolved over time to make fishing truly a sport. In fishing for some large species of fish, large weights are used as sinkers. Some of these weights are over 10 ounces. Typically, these weights are tied onto a fishing line at some distance from the hook. Presently, there is no way to support the weight while baiting the hook or while performing other operations before or after actual fishing. On boats, this causes problems because the weight often rolls around on the deck, or banks against the gunwales. Such banging is not good for the boat or for the fisherperson.

Another problem experienced when fishing in boats is that the fishing tackle must be stored while the boat is moving. Although most large boats have support cups that can hold fishing rods during boat movement, there is no simple way to secure the weights and hooks. Leaving the hooks lying unprotected is dangerous. Moreover, the hooks, weights and lines may become tangled is they are left lying on the deck.

BRIEF SUMMARY OF THE INVENTION

To solve these problems, a basket that can be clamped to a boat's gunwale is used to hold the gear when it is not in use. The basket is large enough to hold the fishing weights and line while a hook is baited, or while the boat is moved. The advantage of the basket is that it holds the weights in a position where the weights cannot bang against the boat or the deck. Moreover, by supporting the weights, the rod and hooks are relatively free of strain. This allows safe and efficient baiting of hooks or storage of rods.

To secure the basket to the boat, a large spring clip is provided. The clip can be opened to fit over the rail of a boat and be closed over the gunwale. The clip is padded to prevent scarring of the boat when the clip is in place. Securing screws are provided to secure the clip to the boat for use.

The basket is a piece of canvas, or similar material, that is suspended between the clips. When the clips are opened and secured over the rail of the boat, the canvas is stretched forming a curved bowl-shaped surface that can hold fishing gear. The basket can be used also to hold the hooks or other gear while the boat is being moved to another location.

Finally, when fishing is done, the screw clamps can be released and the clip can be removed from the boat. Once removed, the clip closes, thereby folding up the canvas basket for storage.

DETAILED DESCRIPTION OF THE INVENTION

Figure 1:
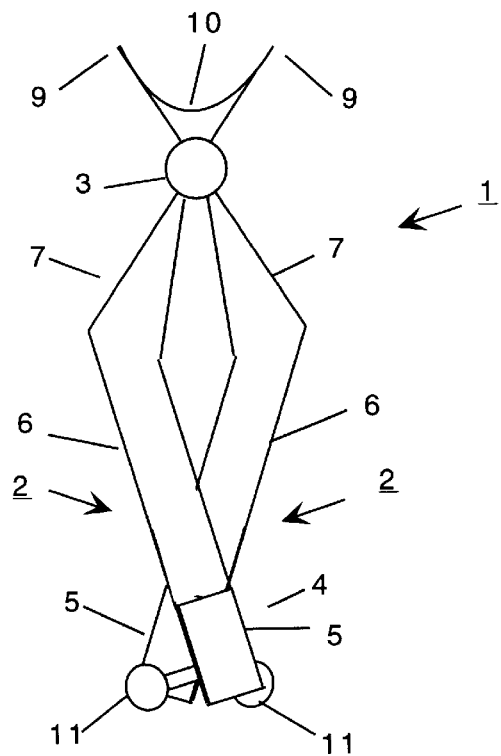
FIG. 1 is a front elevation view of the device in the closed position.
Figure 2:
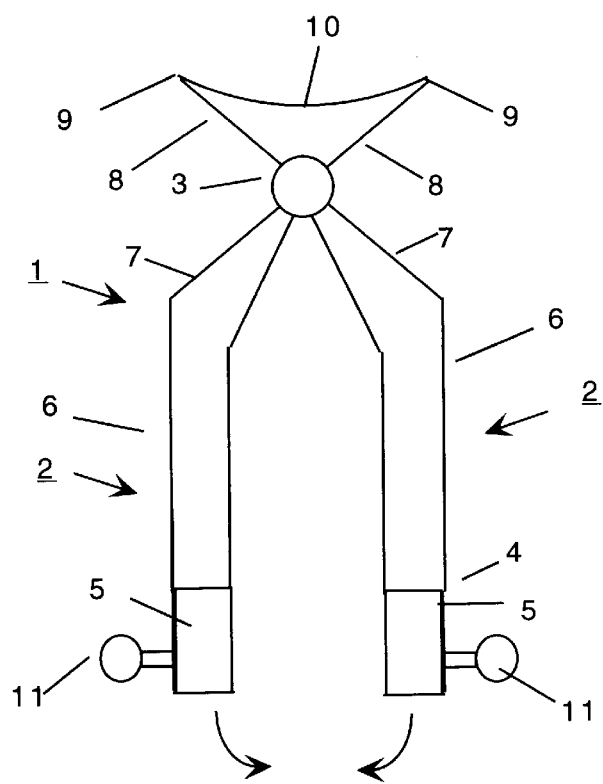
FIG. 2 is a front elevation of the device in the open position.
Figure 3:
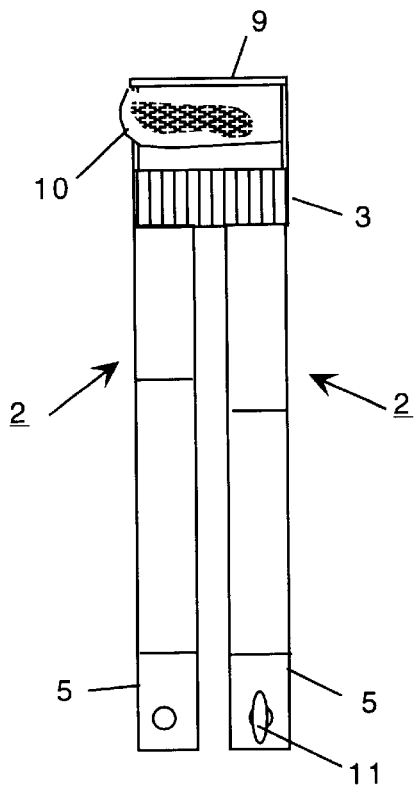
FIG. 3 is a side elevation view of one of the clip arms.

Referring now to FIGS. 1–4, the device 1 is shown. The device has two clip arms 2 that are connected by a spring 3 as shown. FIG. 3 shows one of the clip arms 2. The other clip arm 2 is a mirror image of this clip arm 2. Each clip arm 2 has a bottom portion 4. In the preferred embodiment, the bottom portion 4 is coated with a rubber gripping surface 5 as shown. Next, a lower leg portion 6 extends upward for some distance. The top portion 7 of the lower leg portion 6 is angled inward as shown. The clip arm 2 then has an upper portion 8 that extends out at the same angle to that of the top portion 7 of the lower leg portion 6, on the opposite side of the spring 3. The angles between portion 7 and portion 8 are not required to be the same. Finally, the clip arm ends at the uppermost portion 9 of the clip arm as shown.

The two clip arms 2 are joined as shown by a spring 3. The spring acts to pivot the clip arms 2 inward at the bottom portions 4 (see the arrows in FIG. 2). Because the top portion 8 of the clip arm 2 extends at a reverse angle to the lower portion 4, the uppermost portions 9 are pulled inward as the bottom portions 4 are also pulled inward. When the bottom portions 4 are separated (as in FIG. 2), the uppermost portions 9 also separate.

Figure 5:
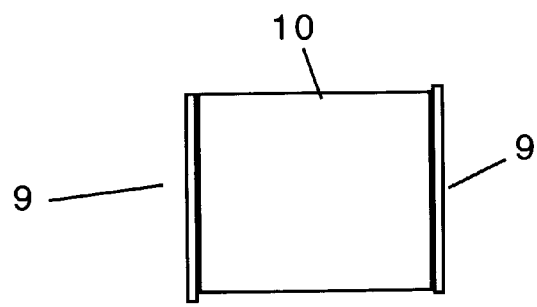
FIG. 5 is a top plan view of the device in the open position.

The "basket", is really a thin, flexible, rectangular sheet 10 of canvas (or similar material). The sheet 10 is attached to the upper most portions 9 of the clip arms, as shown. See, e.g., FIG. 5. When the clip arms 2 are separated (as in FIG. 2), the canvas sheet 10 is stretched between the clip arms 2, thereby forming a bowl like surface. Thus opened, the canvas sheet 10 can be used to hold items, such as weights or other fishing gear.

Figure 4:
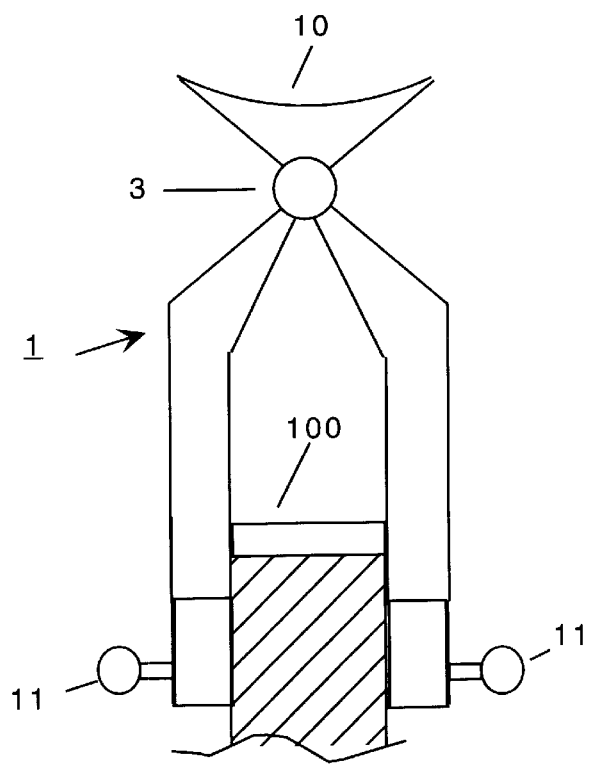
FIG. 4 is a front elevation of the device in the open position, in position on a boat.
Figure 6:
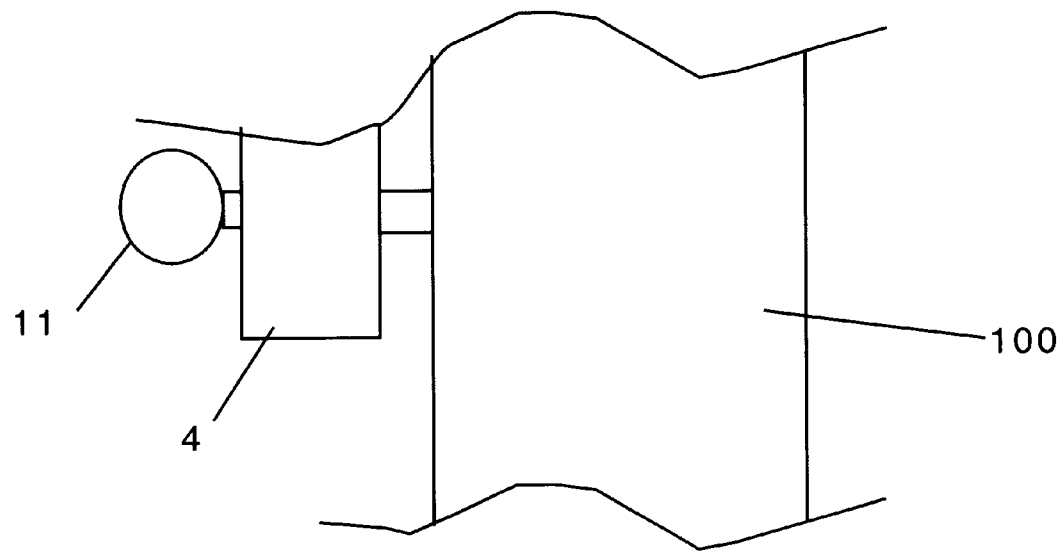
FIG. 6 is a detail view of the screw clamps in place on a boat.

FIG. 4 shows the device 1 as installed on a boat gunwale 100. As shown, the rubber gripping surfaces 5 hold the clip arms 2 against the gunwale 100 without marring it. The gunwale 100 naturally holds the spring clips apart, thereby automatically holding the canvas sheet 10 open. FIG. 6 shows an additional clamping support using two large set screws 11. See also, FIG. 3. The set screws 11 are tightened against the boat as shown to provide additional locking strength of the clip. If desired, the set screws can be removed and permanent mounting bolts can be used instead to secure the clip to the boat for long term use.

Figure 7:
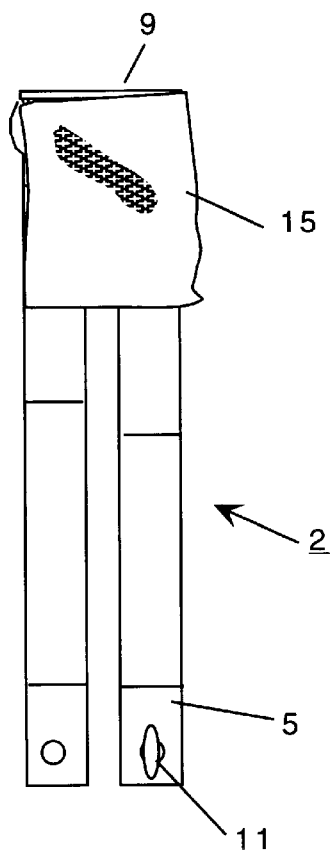
FIG. 7 is a front elevation view of the device with optional storage sleeves.
Figure 8:
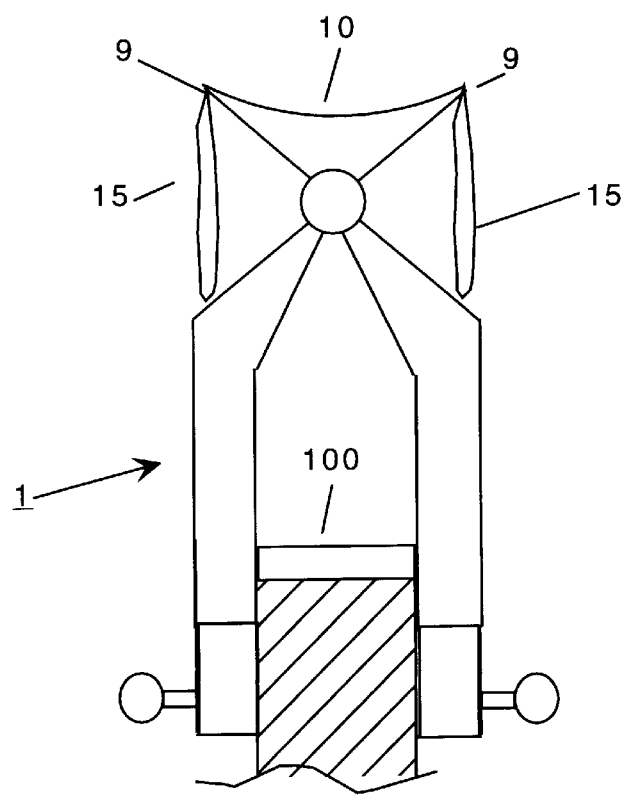
FIG. 8 is a side elevation view of an optional storage sleeve.

FIGS. 7 and 8 show optional accessory bags 15 that are secured to the top of the clip arms as shown. The accessory bags 15 can be used to hold hooks, line, or long thin weights. Use of the accessory bags allows better storage for these times, especially during periods when the boat is moving at high speeds. The accessory bags 15 are made of canvas or similar material and have open tops. They are secured to the top of the clip arms using means common to the are. They can be made removable, if desired, to make the device more versatile.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A support carrier comprising:
   a) a first clip arm, said first clip arm having a bottom;
   b) a second clip arm, being oppositely disposed from said first clip arm, said second clip arm also having a bottom;
   c) a spring means, attached to said first and second clip arms, whereby, said spring means acts to pull said first and second clip arms together;
   d) a basket, attached to said first and second clip arms, such that when said first and second clip arms are pivoted apart, said basket expands; and
   e) a pair of setscrews, operably attached to the bottoms of said first and second clip arms for securing said first and second clip arms to a boat.

2. The support carrier of claim 1 wherein said basket collapses when the first and second clip arms are closed.

3. The support carrier of claim 1 wherein said basket is made of canvas.

4. The support carrier of claim 1 wherein said first clip arm has a bottom and said second clip arm has a bottom; and further wherein said bottoms of said first and second clip arms have a protective coating.

5. The support carrier of claim 1 further comprising an accessory bag, removably attached to said first clip arm.

6. The support carrier of claim 5 further comprising a second accessory bag, removably attached to said second clip arm.

7. A support carrier comprising:
   a) a first clip arm, having a top and a bottom and being articulated such that the top of said first clip arm extends at an angle from said bottom of said first clip arm;
   b) a second clip arm, having a top and a bottom and being articulated such that the top of said second clip arm extends at an angle from said bottom of said second clip arm, said second clip arm being oppositely disposed from said first clip arm;
   c) a spring, attached to said first and second clip arms, whereby, said spring acts to pull the bottoms of said first and second clip arms together;
   d) a supporting means, attached to the top of said first and second clip arms, such that when the bottoms of said first and second clip arms are pivoted apart, said supporting means expands; and
   e) a means for securing the bottoms of said first and second clip arms to a boat.

8. The support carrier of claim 7 wherein said support carrier collapses when the bottoms of said first and second clip arms are pivoted together.

9. The support carrier of claim 7 wherein said supporting means comprises a thin, rectangular sheet of flexible material.

10. The support carrier of claim 9 wherein the thin, rectangular sheet of flexible material is made of canvas.

11. The support carrier of claim 7 wherein the bottoms of said first and second clip arms have a protective coating.

12. The support carrier of claim 7 wherein the means for securing said first and second clip arms to a boat comprise a pair of set screws, operably attached to the bottoms of said first and second clip arms.

13. The support carrier of claim 7 further comprising an accessory bag, removably attached to the top of said first clip arm.

14. The support carrier of claim 13 further comprising a second accessory bag, removably attached to the top of said second clip arm.

* * * * *